United States Patent
Edwards et al.

(10) Patent No.: US 11,194,903 B2
(45) Date of Patent: Dec. 7, 2021

(54) CROSS-MACHINE DETECTION TECHNIQUES

(71) Applicant: CrowdStrike, Inc., Irvine, CA (US)

(72) Inventors: Paul Edwards, Bristol (GB); Jaron Bradley, Mason, MI (US); John Lee, Cleveland, OH (US)

(73) Assignee: Crowd Strike, Inc., Irvine, CA (US)

( * ) Notice: Subject to any disclaimer, the term of this patent is extended or adjusted under 35 U.S.C. 154(b) by 248 days.

(21) Appl. No.: 16/268,334

(22) Filed: Feb. 5, 2019

(65) Prior Publication Data

US 2019/0266324 A1 Aug. 29, 2019

Related U.S. Application Data

(60) Provisional application No. 62/634,408, filed on Feb. 23, 2018.

(51) Int. Cl.
*G06F 21/00* (2013.01)
*G06F 21/55* (2013.01)
(Continued)

(52) U.S. Cl.
CPC ............ *G06F 21/552* (2013.01); *G06F 21/55* (2013.01); *G06F 21/554* (2013.01); *G06F 21/567* (2013.01); *H04L 63/14* (2013.01); *H04W 12/12* (2013.01); *G06F 3/04842* (2013.01); *G06F 2221/033* (2013.01)

(58) Field of Classification Search
CPC ... H04L 63/1425; H04L 63/14; G06F 21/554; G06F 21/55; G06F 21/552; G06F 21/567; G06F 2221/033; G06F 3/023; G06F 3/04842; H04W 12/12
See application file for complete search history.

(56) References Cited

U.S. PATENT DOCUMENTS 9,401,178 B2  7/2016  Bentley et al.
9,406,336 B2  8/2016  Bose et al.
(Continued)

FOREIGN PATENT DOCUMENTS

GB    2568522    5/2019

OTHER PUBLICATIONS

Office Action from the European Patent Office for Application No. 19159021.5, dated May 29, 2020, a counterpart foreign application of U.S. Appl. No. 16/110,927, 8 pgs.
(Continued)

*Primary Examiner* — Ghazal B Shehni
(74) *Attorney, Agent, or Firm* — Lee & Hayes, P.C.

(57) ABSTRACT

A computing device can install and execute a security agent that interacts with a remote security system as part of a detection loop aimed at detecting malicious attacks. The remote security system can receive observed activity patterns from the security agents associated with the computing devices. The remote security system can filter the observed activity patterns to identify "interesting" activity patterns, or activity patterns presenting indications of an attack, including any cross-machine activity. If a first host device is flagged for further threat analysis based on its filtered activity patterns, and at least one of the filtered activity patterns includes remotely accessing a second host device, then the second host device may also be flagged for further threat analysis.

20 Claims, 5 Drawing Sheets

(51) Int. Cl.
  *G06F 21/56* (2013.01)
  *H04L 29/06* (2006.01)
  *H04W 12/12* (2021.01)
  *G06F 3/0484* (2013.01)

(56) References Cited

U.S. PATENT DOCUMENTS

| | | | |
|---|---|---|---|
| 9,830,951 | B2 | 11/2017 | Bose et al. |
| 9,911,045 | B2 | 3/2018 | Bose et al. |
| 10,104,100 | B1* | 10/2018 | Bogorad ............. H04L 63/1425 |
| 10,530,790 | B2 | 1/2020 | Shih et al. |
| 10,884,891 | B2 | 1/2021 | Awad et al. |
| 2005/0273857 | A1* | 12/2005 | Freund ................ H04L 63/1416 726/23 |
| 2007/0209074 | A1 | 9/2007 | Coffman |
| 2007/0209075 | A1* | 9/2007 | Coffman ................. H04L 63/14 726/23 |
| 2009/0132340 | A1 | 5/2009 | Demir et al. |
| 2009/0254970 | A1 | 10/2009 | Agarwal et al. |
| 2011/0083180 | A1 | 4/2011 | Mashevsky et al. |
| 2011/0252032 | A1 | 10/2011 | Fitzgerald et al. |
| 2011/0320816 | A1 | 12/2011 | Yao et al. |
| 2014/0223555 | A1* | 8/2014 | Sanz Hernando .. H04L 63/1416 726/22 |
| 2014/0317741 | A1 | 10/2014 | Be'ery et al. |
| 2014/0325682 | A1 | 10/2014 | Turgeman et al. |
| 2015/0180891 | A1* | 6/2015 | Seward ............... H04L 63/1425 726/22 |
| 2015/0264062 | A1 | 9/2015 | Hagiwara et al. |
| 2016/0065601 | A1* | 3/2016 | Gong ................. H04L 63/1416 726/23 |
| 2016/0105454 | A1 | 4/2016 | Li et al. |
| 2016/0125094 | A1 | 5/2016 | Li et al. |
| 2016/0232032 | A1 | 8/2016 | Azvine et al. |
| 2016/0308888 | A1 | 10/2016 | Vargas Gonzalez |
| 2016/0330226 | A1 | 11/2016 | Chen et al. |
| 2016/0359875 | A1 | 12/2016 | Kim et al. |
| 2017/0295189 | A1 | 10/2017 | Adir et al. |
| 2019/0266323 | A1 | 8/2019 | Nguyen et al. |
| 2019/0268355 | A1 | 8/2019 | Nisbet et al. |
| 2019/0268361 | A1 | 8/2019 | Blewett et al. |

OTHER PUBLICATIONS

Office Action from the European Patent Office for Application No. 19158478.8, dated Jun. 30, 2020, a counterpart foreign application of U.S. Appl. No. 16/268,334, 5 pgs.

Office Action for U.S. Appl. No. 16/110,927, dated Jun. 19, 2020, Nisbet, "Cardinality-Based Activity Pattern Detection", 25 pgs.

"Meet SIEM Needs with EventLog Analyzer", retrieved Sep. 27, 2017 from <<http://web.archive.org/web/20170710040843/https://www.manageengine.com/products/eventlog/security-information-event-management.html>>, 5 pages.

"Proactive Hunting The Last Line of Defense Against the 'Mega Breach'", Crowdstrike, Whitepaper, Sep. 13, 2016, 22 pages.

"Real-Time Event Correlation Engine", retrieved Sep. 27, 2017 from <<http://web.archive.org/web/20170710063729/https://www.manageengine.com/products/eventlog/event-correlation.html>>, 4 pages.

"Security Information and Event Management", retrieved on Sep. 27, 2017 from <<https://en.wikipedia.org/w/index.php?title=Security_information_and_event_management&oldid=801742075>>, Wikipedia, 3 pages.

"Using Pyke", retrieved on Feb. 15, 2019 from <<http://pyke.sourceforge.net/using_pyke/index.html>>, 2 pages.

"Backward Chaining", retrieved Feb. 15, 2019 from <<http://pyke.sourceforge.net/logic_programming/rules/backward_chaining.html>>, 5 pages.

Brown, D., "Understanding Indicators of Attack (IOAs): The Power of Event Stream Processing in CrowdStrike Falcon", Endpoint Protection, Mar. 14, 2017.

Gallant, Andrew, "Index 1,600,000,000 Keys with Automata and Rust", retrieved on Jul. 19, 2017 from <<http://blog.burntsushi.net/transducers/>>, Nov. 11, 2015, 50 pages.

Wang, Y-M., et al., "Gatekeeper: Monitoring Auto-Start Extensibility Points (ASEPs) for Spyware Management", 2004 LISA XVIII, Nov. 14-19, 2004, pp. 33-46.

The Extended European Search Report from the European Patent Office for Application No. 19158478.8, dated Jun. 12, 2019, a counterpart foreign application of U.S. Appl. No. 16/268,334, 7 pages.

The Extended European Search Report from the European Patent Office for Application No. 19157857.4, dated Jun. 13, 2019, a counterpart foreign application of U.S. Appl. No. 16/268,334, 7 pages.

The Extended European Search Report from the European Patent Office for Application No. 19156473.1, dated Jun. 5, 2019, a counterpart foreign application of U.S. Appl. No. 16/268,334, 7 pages.

The Extended European Search Report from the European Patent Office for Application No. 19159021.5, dated Jun. 7, 2019, a counterpart foreign application of U.S. Appl. No. 16/268,334, 7 pages.

Office Action for U.S. Appl. No. 16/168,588, dated Oct. 1, 2020, Nguyen, "Identification Process for Suspicious Activity Patterns Based on Ancestry Relationship", 23 Pages.

Office Action for U.S. Appl. No. 16/110,927, dated Nov. 9, 2020, Nisbet, "Cardinality-Based Activity Pattern Detection", 28 pages.

Office Action for U.S. Appl. No. 16/281,277, dated Jul. 9, 2021, Blewett, "Computer-Security Event Analysis", 14 Pages.

* cited by examiner

CROSS-MACHINE DETECTION TECHNIQUES

RELATED APPLICATION

This patent application claims priority to U.S. Provisional Application No. 62/634,408 titled "Computer Security," filed on Feb. 23, 2018, commonly assigned herewith, and hereby incorporated by reference.

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

To meet the threats posed by these security exploits, a number of tools capable of retrospective analysis of system performance and state have been developed. For example, the BackTracker tool described in "Backtracking Intrusions" by Samuel T. King and Peter M. Chen (ACM SIGOPS Operating Systems Review—SOSP '03, Volume 37, Issue 5, December 2003, pgs. 223-236) automatically identifies potential sequences of steps that occurred in an intrusion by analyzing a comprehensive log of system activity patterns and data. While such tools can detect security exploits and their manners of operation, they can only operate retrospectively and thus place those attacked at a disadvantage, always one step behind the attacker. Further, these techniques typically operate only on records of a single device, and thus lack the context of activity patterns occurring on other devices, which may be important in determining whether novel or unusual behavior is suspect.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
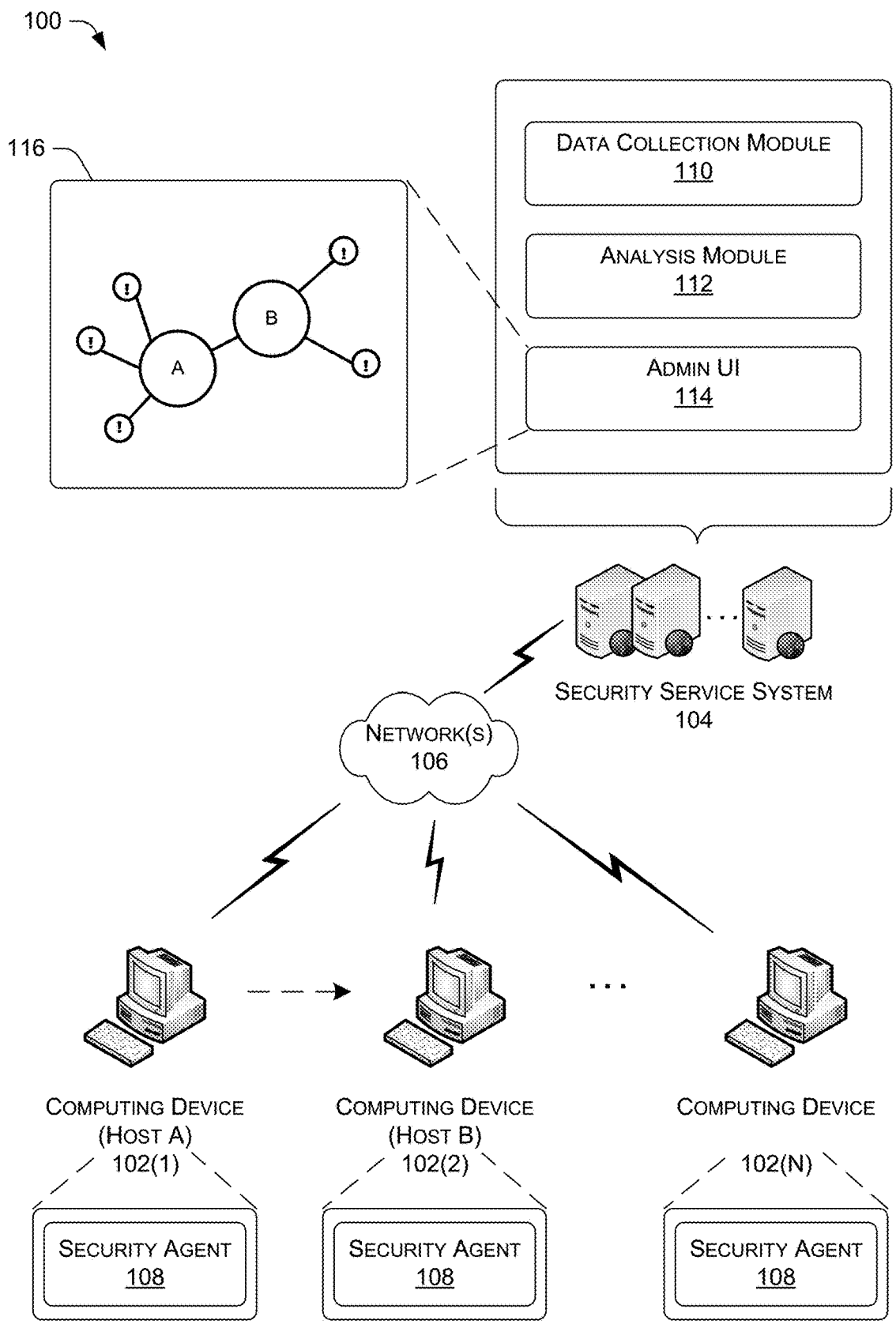
FIG. 1 illustrates an example system for a security service system that monitors threats on a plurality of host devices and uses cross-machine security information to help determine if a host device is under attack.

This disclosure describes, in part, techniques and systems for cross-machine threat detection between monitored computing devices that may have been "compromised" by malware or malicious attack. A remote security service may monitor host devices belonging to one or more entities and analyze observed activity patterns on the host devices to look for indicators of attack. When the particular host device exhibit signs of being "compromised" by a possible attack, the remote security service may investigate the interesting activity patterns on the particular host device. In some instances, malicious activity pattern from a compromised host machine can spread to network-adjacent host machines. Thus, as part of the investigation, the security service may watch for activity patterns that involve that particular host device remoting (e.g., with Remote Desktop Protocol, SSH, or the X Window System) into another host device or vice versa. To present suspicious cross-machine activity, the filtered activity patterns of host devices connected by suspicious cross-machine detection may be grouped together as a group of activity patterns to be analyzed together.

A computing device may install, and subsequently execute a security agent as part of a security service system to monitor and record activity pattern on a plurality of host computing devices in an effort to detect, prevent, and mitigate damage from malware or malicious attack. Upon installation on a host computing device, the security agent can observe activity patterns associated with the host computing device, and the security agent can send those observed activity patterns (or data associated with the observed activity patterns) to a remote security system implemented in the "Cloud" (the "remote security system" also being referred to herein as a "security service system," a "remote security service," or a "cloud security service"). At the remote security system, the received activity pattern data can be analyzed for purposes of detecting, preventing, and/or defeating malware and attacks. The security agent resides on the host computing device, observes and analyzes semantically-interesting activity patterns that occur on the host computing device, and interacts with a remote security system to enable a detection loop that is aimed at defeating all aspects of a possible attack.

When a possible attack is detected on a first host device using the aforementioned detection loop, the security service system may also monitor any cross-machine activity on secondary host device(s) that is connected to the first host device. The first host device and the secondary host device(s) may belong to the same entity or different entities. Although the secondary host device(s) may exhibit no obvious signs of an attack, the security service system may group the suspicious activity patterns on both the first and the secondary host device(s) as a group of activity patterns. In grouping the suspicious activity patterns together, all the security information related to the activities data from the connected devices may be gathered and presented to a security service analyst. By grouping the activity patterns and analyzing all the security information together, the analyst can better analyze the cross-machine activities to determine if one of the devices is already compromised and being controlled to attack other devices.

The security information may include one or more of threat information, remediation information, attack data, vulnerability information, reverse engineering information, packet data, network flow data, protocol descriptions, victim information, threat attribution information, incident information, proliferation data, user feedback, information on systems and software, or policies. The entities may be organizations, such as businesses, academic institutions, or governmental entities, or may be individuals or groups of individuals. Each entity is associated with one or more computing devices, and each computing device may include a security agent that serves as a client to a security service. Further, each entity may be able to impose a security scheme or policy on its computing device(s) but unable to impose or enforce a security scheme or policy on the computing device(s) of other entities. The security agents may observe and act on execution activity patterns of their respective computing devices and may generate security information based on the observed execution activity patterns. This generated security information is provided to the security service. Because these entities receive services from the security service, they are referred to herein as "client entities."

In some embodiments, the security service may alert a security analyst of the suspicious activity pattern detected in the group of activity patterns involving cross-machine activity. If an attack is confirmed and all the host devices in the group belong to the same entity, the security analyst may generate a threat report for the client entity detailing the activity patterns on all machines. If the devices belong to different entities, a different threat report may be generated for each entity to preserve confidential information of each client. Thus, each entity may be able to apply its security scheme or take steps to safeguard its computing device(s) without revealing the client identity.

In various embodiments, the techniques and systems described herein may effectively generate threat reports of "adversaries" that may have compromised a first host machine and is controlling the first host machine to attack a secondary host machine(s). By collecting the activities data from connected machines, a more comprehensive analysis of the threat can be made, thereby mitigating damage that can be inflicted or has been inflicted by such adversaries. In some embodiments, if the first and secondary host machines belong to different entities, the security system may generate different threat reports for each client entities while protecting their identities and confidential information. Thus, the client entities may be notified of any known adversary group information and steps to protect themselves without any one entity having to divulge that they were under attack. "Adversaries" is used herein to include, without limitation, any entities that conduct target reconnaissance, entities that execute the operation, entities that develop exploits, entities that perform data exfiltration, entities that maintain persistence in the network, and so on. Thus, adversaries can include numerous people (or software entities) that are all part of an adversary group.

FIG. 1 illustrates an example system 100 for a security service system that monitors threats on a plurality of host devices and uses cross-machine security information to help determine if a host device is under attack. The system 100 may include computing device(s) 102(1)-102(N) (individually and/or collectively referred to herein with reference 102), where N is any integer greater than or equal to 2, that interact with security service system 104 over a network 106.

In some embodiments, the network 106 may include any one or more networks, such as wired networks, wireless networks, and combinations of wired and wireless networks. Further, the network 106 may include any one or combination of multiple different types of public or private networks (e.g., cable networks, the Internet, wireless networks, etc.). In some instances, the computing devices 102 and the security service system 104 communicate over the network 106 using a secure protocol (e.g., https) and/or any other protocol or set of protocols, such as the transmission control protocol/Internet protocol (TCP/IP).

The computing device 102 (sometimes called "host device," "host computing device," "host machine," or "monitored device") may implement a security agent 108, which is stored in memory of the computing device 102 and executable by one or more processors of the computing device 102. The computing devices 102 may be or include any suitable type of computing devices 102, including, without limitation, a mainframe, a work station, a personal computer (PC), a laptop computer, a tablet computer, a personal digital assistant (PDA), a cellular phone, a media center, an embedded system, or any other sort of device or devices. An entity may be associated with the computing devices 102, and the entity may have registered for security services provided by a service provider of the security service system 104.

The security agent 108 may, in some embodiments, be kernel-level security agents. Such kernel-level security agents may each include activity pattern consumers that receive notifications of activity patterns associated with execution activity patterns of their respective computing device 102, filters, an activity pattern bus that route activity patterns to other agent module(s), correlators that track types of activity patterns, actors that gather state information and act upon activity patterns, and a situational model. The kernel-level security agents may each be installed by and configurable by security service system 104, receiving, and applying while live, reconfigurations of agent module(s) and the agent situational model. Further, the kernel-level security agents may each output activity patterns to the security service system 104, the activity patterns including the security-relevant information determined by the security agents 108. The security agent 108 may continue to execute on the computing device 102 by observing and sending activity patterns to the security service system 104 while the computing device 102 is powered on and running.

In some embodiments, the security agents 108 may be connected to the security service system 104 via a secure channel, such as a virtual private network (VPN) tunnel or other sort of secure channel and may provide activity patterns conveying security-relevant information to the security service system 104 through the secure channel. The security agents 108 may also receive configuration updates, instructions, remediation, etc. from the security service system 104 via the secure channel.

The computing devices 102 may receive the security agent 108 over the computer network 106 from the security service system 104 by downloading the security agent 108 as a software package to be installed on the computing devices 102. Together, the security agent 108 of the computing devices 102 and the security service system 104 form a detection loop, which can be enabled by an agent architecture designed in accordance with the principles of the well-known OODA-loop (i.e., observe-orient-detect-act-loop). The security agent 108 may include components that receive notifications of semantically-interesting activity patterns (e.g., file writes and launching executables) from host operating system hooks or filter drivers, from user-mode activity pattern monitors, or from threads monitoring log files or memory locations. Thus, the security agent 108 may observe activity patterns, determine actions to take based on those activity patterns, and/or send observed activity patterns to the security service system 104 for further analysis at the security service system 104.

The activity patterns observed by the security agent 108 may be sent over the computer network 106 to the security service system 104, with or without further processing by the security agent 108. For example, in some embodiments, the activity patterns observed by the security agent 108 may be filtered using first configurable filters of the security agent 108 to remove known safe activity patterns to help reduce size of data transfer and then sent to the security service system 104 for additional filtering using more stringently-configured second configurable filters. Alternatively, the activity patterns can be sent to the security service system 104 without further filtering on the computing devices 102.

A security agent 108 of a computing device 102 may trigger varying levels of containment for the computing device 102 based on varying levels suspicious activity patterns. In response to determining that the computing device 102 is compromised (e.g., received activity patterns are associated with malicious code), the security service system 104 can send a containment instruction over the network 106 to the computing device 102. Upon receipt of this containment instruction, the security agent 108 may cause the computing device 102 to enable (activate, trigger, etc.) network containment. To enable network containment on the computing device 102, the security agent 108 can implement a firewall policy included with the security agent 108. Upon enforcement of the firewall policy, a firewall of the computing device 102 denies outgoing data packets from, and incoming data packets to, the computing device 102 that would have been allowed prior to the implementing of the firewall policy. In some embodiments, the firewall policy, may deny all traffic to and from the computing device 102 with respect to other computing systems having remote network addresses (e.g., Internet Protocol (IP) addresses) that are not otherwise specified in the firewall policy as an exception for allowed traffic. In various embodiments, however, network containment can be implemented on the computing device 102 in a manner that allows some communication to/from the computing device 102 with the outside world over the network 106. For example, the firewall policy can specify exceptions for remote network addresses that are allowed to communicate with the computing device 102 after containment is enabled/initiated and while the computing device 102 remains contained. The firewall policy may allow some traffic to and from the security service system 104 so that a communication channel remains open and usable between the computing device 102 and the security service system 104, even when the computing device 102 is "contained" (or cutoff from communicating with the other computing device(s) 102 besides the security service system 104). To accomplish this result, the firewall policy can specify at least one remote network address (e.g., a remote IP address) associated with the security service system 104, and may specify an action to allow outgoing data packets to, and incoming data packets from, the security service system 104, which may be associated with the at least one remote network address that can be specified in the firewall policy. In some embodiments, the containment instructions may specify an action to block a specific suspicious activity pattern rather than trigger network containment if the suspicious activity pattern is limited in action.

In at least one configuration, the security service system 104 may include any components that may be used to collect and analyze the observed activity patterns received from computing device(s) 102, to report on suspicious activity patterns, and to mitigate any malware or malicious code found in the computing device(s) 102. For example, the security service system 104 may include a data collection module 110, an analysis module 112, and an administrative user interface (UI) 114.

The data collection module 110 may receive and store any client entity information and their associated security information including observed activity patterns received from the security agent on the computing device(s) 102. Additionally, the data collection module 110 may gather data from various sources for use with other modules. For example, the data collection module 110 may gather enrichment data to help provide context to observed activity patterns.

The analysis module 112 may determine if computing device 102 is potentially compromised. Determining whether the computing device 102 is potentially compromised may include determining whether the activity patterns observed by the security agent 108 are associated with malicious code or indicators of attack. In some embodiments, the analysis module 112 may analyze the observed activity patterns including cross-machine activities to determine if the connected computing devices 102 are potentially compromised.

As a non-limiting example, the analysis module 112 may determine that the fidelity value for the observed activity patterns from Host A device 102(1) is above a predetermined threshold, thus indicating a possible attack. A low fidelity value may indicate a low probability of an attack. Based on having a high fidelity value above a predetermined severity threshold value, the analysis module 112 may alert a security analyst by presenting the activities data from Host A device 102(1) for additional analysis. One of these observed activity patterns may also indicate that the Host A device 102(1) is currently remoting into Host B device 102(2). Because of its connection with a possibly compromised Host A device 102(1), the observed activities data for Host B device 102(2) may be similarly presented to a security analyst. In some embodiments, the analysis module 112 may group the observed activities data for Host A device 102(1) and Host B device 102(2) as a group of activity patterns, and present the group of activity patterns together for the security analyst to further analyze.

The administrative user interface (UI) 114 may enable a security analyst (also referred to as an administrator, support personnel, etc.) associated with the security service system 104 to view notifications of observed activity patterns, alerts pertaining to computing devices 102 that have been compromised, and make decisions regarding appropriate responses to those activity patterns and alerts. The example administrative UI 114 may present the alerts with visualization for the group of activity patterns. For example, administrative UI 114 may present the example group A-B graphical representation 116 to highlight the cross-machine detection and the interesting activity patterns observed on each machine. The administrative UI 114 may elect to present different groups of activity patterns as different graphical rendering similar to the group A-B graphical representation 116 to alert a human analyst of the cross-machine activity detected. Presenting Host A device 102(1) and Host B device 102(2) in this manner is merely one example way of presenting computing devices 102 in the administrative UI 114, and the example administrative UI 114 is not limited to this manner of presenting currently-monitored machines 102.

As a non-limiting example, the group A-B graphical representation 116 may render the Host A device 102(1) and Host B device 102(2) as large nodes (example presentation of the nodes are circular but this may be any shape, size, icons, marks, sprite, 3-dimensional models, or graphical element) with a connecting element between node A and node B to represent the cross-machine detection event. The three smaller nodes marked with "!" with connecting elements to node A may represent the interesting event(s) (not including the A-B cross-machine event) observed on Host A device 102(1). The two smaller nodes marked with "!" with connecting elements to node B may represent the interesting event(s) (not including the A-B cross-machine event) observed on Host B device 102(2). Thus, in this example graphical representation, not counting the cross-machine event, three and two interesting activity patterns have been observed on Host A device 102(1) and Host B device 102(2), respectively.

Figure 2:
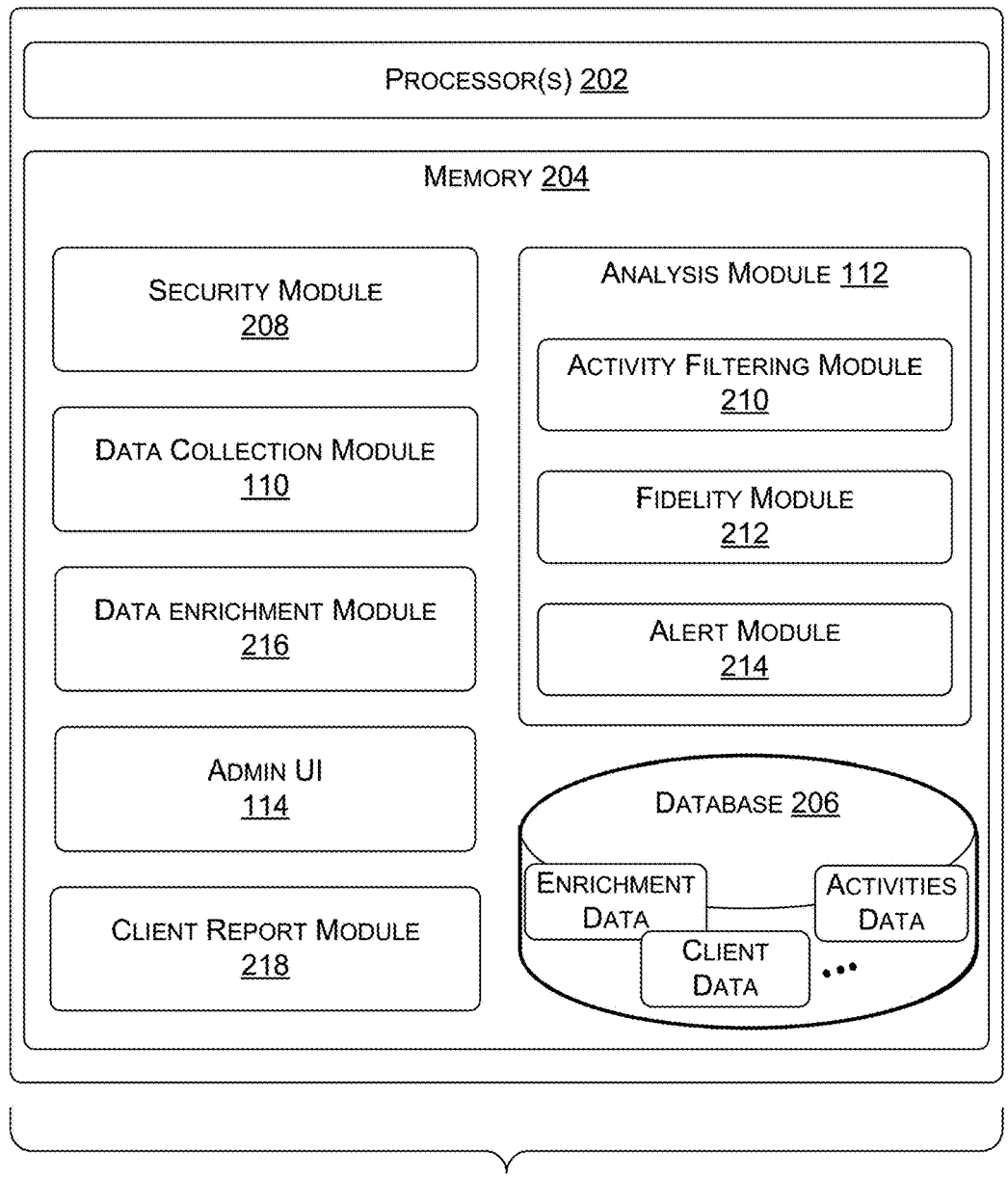
FIG. 2 is a block diagram of an illustrative computing architecture of the security service system.
Figure 2:
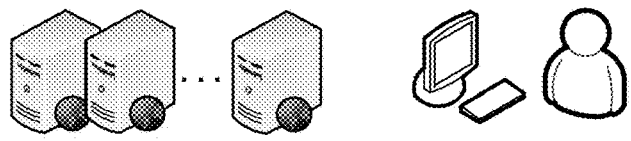

FIG. 2 illustrates an example block diagram of computing architecture 200 of the security service system 104. The computing architecture 200 may be implemented in a distributed or non-distributed computing environment.

The computing architecture 200 may include one or more processors 202 and a computer-readable memory 204 that stores various modules, applications, programs, or other data. The computer-readable memory 204 may include instructions that, when executed by the one or more processors 202, cause the processors to perform the operations described herein for the system 100.

In various embodiments, the computer-readable memory 204 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 204 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RANI, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the security service system 104. Any such memory 204 may be part of the security service system 104.

In some embodiments, the computer-readable memory 204 may store the security module 208, the data collection module 110, the analysis module 112 and associated components, the data enrichment module 216, the administrative UI 114, the client report module 218, and the database 206, which are described in turn. The components may be stored together or in a distributed arrangement.

The security module 208 may communicate with the security agent 108 of the computing devices 102, and to evaluate "interesting" activity patterns identified by the security agent 108. For example, the security service system 104 may be configured to receive activity patterns and data related to such activity patterns, such as forensic data associated with observed activity patterns. Upon receiving notification of an interesting activity pattern from a security agent 108, the security module 208 may determine if related notifications have been received from other security agents 108 of other computing devices 102. Additionally, and/or alternatively, the security module 208 may evaluate the interesting activity pattern based on one or more rules or heuristics. The security module 208 may determine that an interesting activity pattern may be associated with malicious attack based on these determinations and evaluations and may, in response, perform any or all of generating an activity pattern and providing the activity pattern to computing devices 102 (e.g., for containment purposes, and/or diagnostic, healing, or other purposes), sending updates (e.g., a new version of the security agent 108, new signatures, new firewall policies etc.), instructing the computing devices 102 to perform a remediation action to heal the computing devices 102 or otherwise counter malicious code. In various embodiments, the security module 208 may send a containment instruction, to a security agent 108 residing on a computing device 102, to specify an action to block a specific "interesting" activity pattern observed. For example, if the security module 208 determines that there is a malicious process running cross-machine between computing devices 102, the security module 208 may send instructions to block that activity pattern. In some embodiments, if the same malicious process is observed on multiple devices, the security module 208 or another component of the security service system 104 may dynamically generate a new policy specifying an action to block the specific activity pattern and send the new policy to the security agent 108 residing on other computing devices 102 belonging to a certain client entity or all clients based on the devices affected.

The data collection module 110 may receive and store any client entity information and their associated security information including observed activity patterns received from the security agent 108 on the respective computing device(s) 102. The data collection module 110 may gather data from other modules that may be stored in database 206. In some embodiments, the data collection module 110 may gather and store data associated with known information, such as domain information that is associated with known entities, for use as enrichment data by the data enrichment module 216.

The database 206 may store at least some data including, but not limited to, data collected from data collection module 110, security module 208, analysis module 112, and data enrichment module 216, including data associated with client data (e.g., client entity profiles), feedback data, security information, enrichment data, observed filtered and non-filtered activities data, and signature files. Client data may include client entity profiles(s), which may further include one or more user profiles associated with the client entity. In some examples, a user profile may include information associated with an individual user having computing device 102 access at the client entity. The user profile may also indicate the user's position within the entity to provide additional information on whether the user's activities on a computing device 102 is within the scope of the user's position. For instance, a helpdesk technician remotely accessing another device to install software may be less of an indicator of attack than a receptionist remotely accessing another device to install software. In additional or alternative examples, at least some of the data may be stored in a cloud storage system or other data repository.

The analysis module 112 may include activity filtering module 210, fidelity module 212, and alert module 214. The analysis module 112 may determine if computing device 102 is potentially compromised. Determining whether the computing devices 102 is potentially compromised may include determining whether the activity patterns observed by the security agent 108 are associated with malicious code or indicators of attack. In some embodiments, the analysis module 112 may analyze the observed activity patterns that include cross-machine activity patterns to determine if the computing devices 102 are potentially compromised. In various embodiments, the analysis module 112 may analyze the observed activity patterns within a predefined time period that may be set to a default time period and may be modified by the analyst 220. The analysis module 112 may store all activities data as historical data that may be accessed by the analyst 220 for further analysis.

The activity filtering module 210 may receive unprocessed or partially processed activities data from the security agents 108. As previously discussed, the activity patterns observed by the security agent 108 may be filtered using first configurable filters of the security agent 108 to remove known safe activity patterns to help reduce size of data transfer or the activity patterns may be sent to the security service system 104 without further processing on the computing devices 102. The activity filtering module 210 may have one or more configurable filters including filtering rules set by the analyst 220.

In some embodiments, the activity filtering module 210 may also maintain and utilize one or more situational models, such as models specific to individual computing devices 102, to types of computing devices, to entities, or to a generic device to determine which activity patterns are "interesting" and may warrant additional analysis from the analyst 220. For example, while a host A machine remoting into a host B machine to run an executable file may be an "interesting" event, if the host A machine ran the same file on a hundred machines belonging to the same entity, this may be normal administrative behavior. Thus, the activity filtering module 210 may filter the observed activity patterns received from security agent 108 to remove the many legitimate use activity patterns to isolate "interesting" filtered activity patterns. The security service system 104 may update these models based on the received notifications and utilize the models in analyzing the interesting activity patterns. In some embodiments, the activity filtering module 210 may utilize a machine learning model (or algorithm) that is trained on a past corpus of activity patterns and detected malware attacks/intrusions on computing devices 102 that utilized the security service system 104. Such a machine learning model is configured to process activity patterns received from a computing device 102 as input, and to generate an output of filtered activity patterns that is utilized by components of the security service system 104 in analyzing the severity of threat on computing devices 102.

Machine learning generally involves processing a set of examples (called "training data") in order to train machine learning model(s). A machine learning model, once trained, is a learned mechanism that can receive new data as input and estimate or predict a result as output. For example, a trained machine learning model can comprise a classifier that is tasked with classifying unknown input (e.g., an unknown activity patterns) as one of multiple class labels (e.g., a class label of "compromised" vs. "uncompromised", "high severity level" vs. "low severity level", etc.). Any single machine learning model, or an ensemble of base-level machine learning models, can be used for this purpose, including, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some embodiments, the activity filtering module 210 may classify the severity level for the filtered activity depending on the activity pattern type, based on whether that particular activity pattern type is a stronger indication of attack. That is, an activity pattern with explicit threat data showing obvious suspicious activity pattern on a remote system may be classified as a high severity level, while an activity pattern with inferred threat data showing signs of suspicious activity pattern may be classified as a medium severity level. For instance, an activity pattern with explicit data showing that Host A remoted into Host B, and is running multiple data gathering commands with lateral movement or is downloading suspicious files and scheduling tasks to run the files, may be classified as high severity level.

The fidelity module 212 may determine a fidelity value for each of the devices 102 based at least in part on the filtered activity patterns from the activity filtering module 210, the time period of the observed activity pattern, and the classification of severity level. If the fidelity value is above a predetermined severity threshold, an alert for analyst 220 may be generated for further analysis. In some embodiments, the fidelity value for a host device may be based on the cardinality of the set of filtered activity patterns associated with the host device within a predefined time period. That is, the fidelity value is the number of activity patterns in the set. Additionally and/or alternatively, the fidelity value for a host device may be based on the severity level of the filtered activity patterns associated with the host device, such that if even one of the activity patterns is classified as high severity level, the fidelity value may be set to a value higher than the predetermined severity threshold. In various embodiments, the severity levels may be assigned a corresponding weight, and the fidelity value may be a tally of the activity patterns modified by the weight. In some embodiments, the fidelity module 212 may increase a first fidelity value on a first host device by at least a portion of a second fidelity value of a second host device that is acting remotely on the first host device. Additionally, and/or alternatively, host devices with "interesting" remoting activity patterns between them may be grouped together into a group of activity patterns and a fidelity value may be determined for the group. The group fidelity value may be based on the highest fidelity value for any one device in the group, or may be based on the cardinality of the set of filtered activity patterns associated with all the devices in the group.

As a non-limiting example, a Host B device may exhibit mere irregular behavior when looked at in isolation, such that even though a Host A device has remoted in and has executed some simple commands, the fidelity value for Host B device may remain relatively low. However, if the fidelity value of Host A device is extremely high, thus indicating a high probability that the Host A device has been compromised, the simple commands may be part of a larger threat of data gathering on a target before an attack. Thus, the fidelity value of Host B device may be increased by some portion of the fidelity value of Host A device or the fidelity value of Host B device may be the group fidelity value of Host A and Host B together, to help surface Host B device as a higher priority threat to investigate.

The alert module 214 may generate alerts for an analyst 220 to further investigate a possible attack on a device 102 or generate notifications of interesting activity patterns that needs further analysis. Additionally, to help draw attention to high severity level activity patterns or activity pattern groups, the alert module 214 may establish a threat alert priority scheme to help prioritize the presentation of activity patterns and alerts. The threat alert priority scheme may be based on the fidelity value, severity level, alert timeline, or any combination thereof. For example, the activity patterns and alerts may be ranked according to their severity level, followed by fidelity values, so that the activity patterns and alerts with highest severity level are presented first, sorted by the highest fidelity values first; then the next severity level is presented, sorted by the highest fidelity values first.

The data enrichment module 216 may augment the activities data to provide context for a human analyst 220 or users from the entities associated with the devices 102 to better understand the activity patterns and alerts. The activities data may be strings of number and letters without meaning to a human reader, however the data enrichment module 216 may include rules and scripts to automatically tag and enrich the activities data to generate augmented data. For example, if a certain domain is associated with a named entity, the data from the certain domain may be enriched with named entity.

Figure 4:
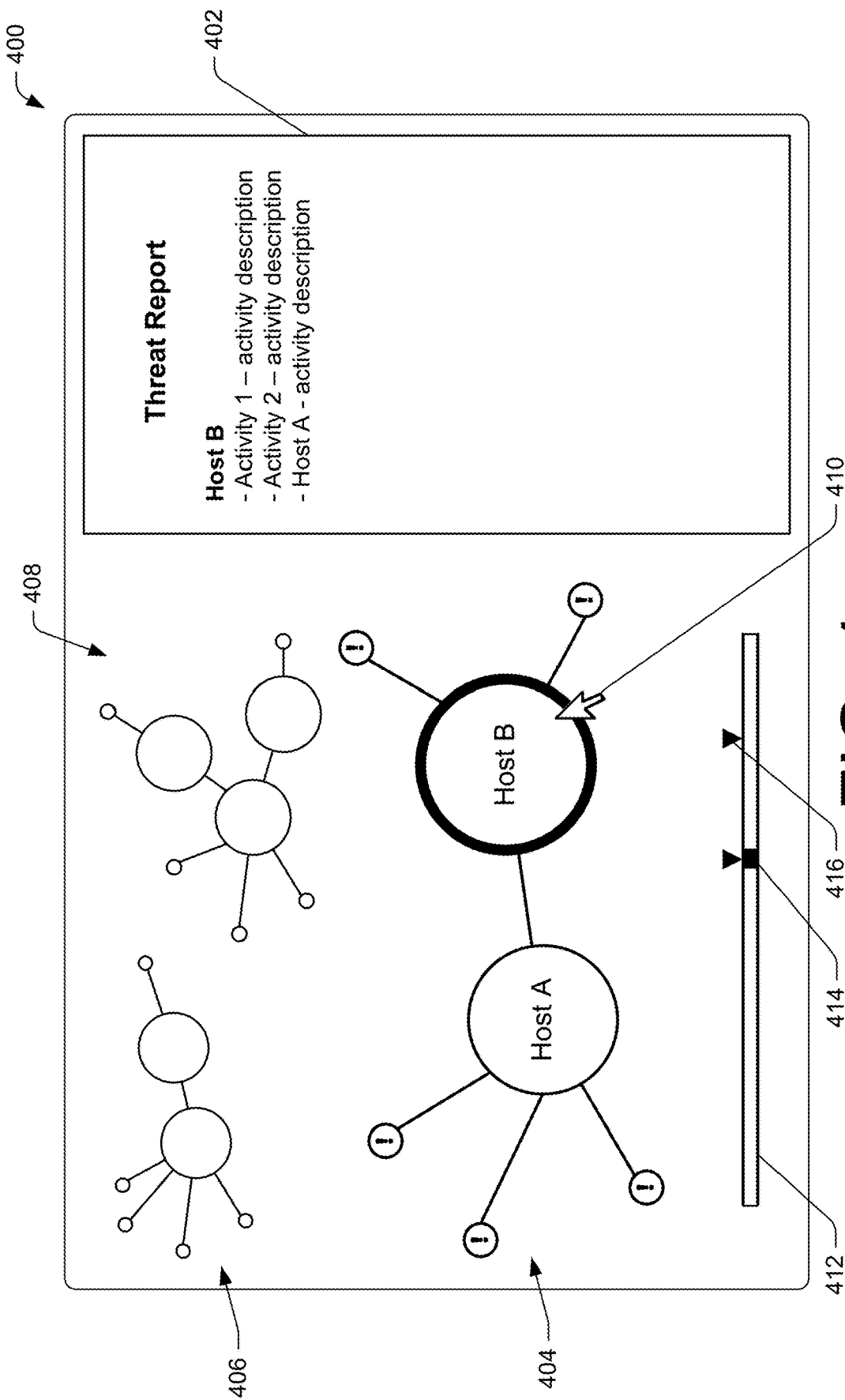
FIG. 4 is a schematic diagram showing an example administrative user interface that may be presented to a security system analyst based on cross-machine detection.

The administrative user interface (UI) 114 may enable an analyst 220, who is associated with the security service system 104, to view notifications of observed activity patterns, alerts pertaining to machines 102 that have been compromised, and make decisions regarding appropriate responses to those activity patterns and alerts. An example of the administrative UI 114 is shown in FIG. 4, which presents multiple graphical representations of alerts for "machines" corresponding to computing devices, like the computing devices 102, that are currently being monitored via the detection loop between security agents 108 and the security service system 104, as described herein.

The administrative UI 114 can present an alert indicating that a particular machine(s) 102 have been potentially compromised. These alerts may be based on the respective activity patterns observed by the respective security agents 108 executing on those machines 102, which activity patterns may have been determined to be associated with malicious code. It is to be appreciated that the administrative UI 114 may also enable the analyst 220 to examine activity patterns and associated data without first providing an alert.

The administrative UI 114 may further present a selection element that, upon selection, provides further details pertaining to the alert, indicating a particular machine 102 has been compromised. By selecting the particular machine 102, the analyst 220 can get detailed information as to the particular observed activity patterns, processes executing on the computing devices 102 relating to those activity patterns, and/or other details about the potentially compromised machine 102.

In various examples, the administrative UI 114 may present the historical data associated with the particular machine(s) 102 for the analyst 220 to perform further analysis. The administrative UI 114 may present a timeline selection element that, upon selection, provides details pertaining to the historical activity patterns during a selected time period. In some examples, the administrative UI 114 may present a log of any cross-machine activities for the selected time period. The administrative UI 114 may present indicators within or over the timeline selection element to indicate certain activity pattern types to aid the analyst 220 in identifying certain activity patterns. In additional examples, the administrative UI 114 may present a timeline that spans a lower portion of the UI and the timeline may be tagged with indicators that may include different shapes (e.g., triangles, stars, circles, etc.) to visually highlight the different activity pattern types that was detected at a given time. For instance, the administrative UI 114 may present an activities timeline for "Host A" and may indicate cross-machine activities with indicator triangles on the activities timeline for "Host A" to alert the analyst 220 of potential cross-machine attacks. In the present example, the indicator triangles may indicate that "Host A" logged into "Host B" an hour ago and logged into "Host C" half an hour ago in the timeline and thus flag these activities for further analysis.

The administrative UI 114 may further present selection elements that, upon selection, causes the client report module 218 of the security service system 104 to automatically generate a report by populating at least a portion of a client report including some of the augmented data for the client entity associated with the computing device 102 in question. In some embodiments, the analyst 220 may complete the remaining client report before sending the report to the computing device 102 or entity associated with the computing device 102. In this example, there may be instances where the analyst 220 notices an alert of a potentially compromised machine 102 in the administrative UI 114, but after further inspection (e.g., by viewing further details about the activity pattern on the computing devices 102), the analyst 220 may determine, above some threshold level of confidence, that the machine 102 is actually, or most likely, not compromised by malware, and may decide to refrain from reporting the machine 102.

In other embodiments, the client report module 218 of the security service system 104 may be configured to determine to surface a particular computing device 102 automatically (i.e., without human intervention), and may send non-confidential activity patterns alert to the particular computing device 102 without human intervention as well. For example, as discussed above, if the alert module 214 has determined that the fidelity value for a Host A device is extremely high, the client report module 218 may alert the client entity associated with Host A device to begin taking at least some remedial actions on their devices. Additionally, an activity patterns notification that a remote activity pattern has been observed on Host B device may be automatically sent to the associated client entity. The client report module 218 may present the alerts and notifications to the client entity utilizing any communication channel, such as an e-mail message, a website associated with the security service system 104, a text message, a push notification, a social network site, an application that is associated with the security service system 104 and that resides on device(s) 102 associated with the client entity.

In some instances, any or all of the devices and/or components of the security service system 104 may have features or functionality in addition to those that FIG. 2 illustrates. For example, some or all of the functionality described as residing within any or all of the devices of the security service system 104 may reside remotely from that/those device(s), in some implementations.

Figure 3:
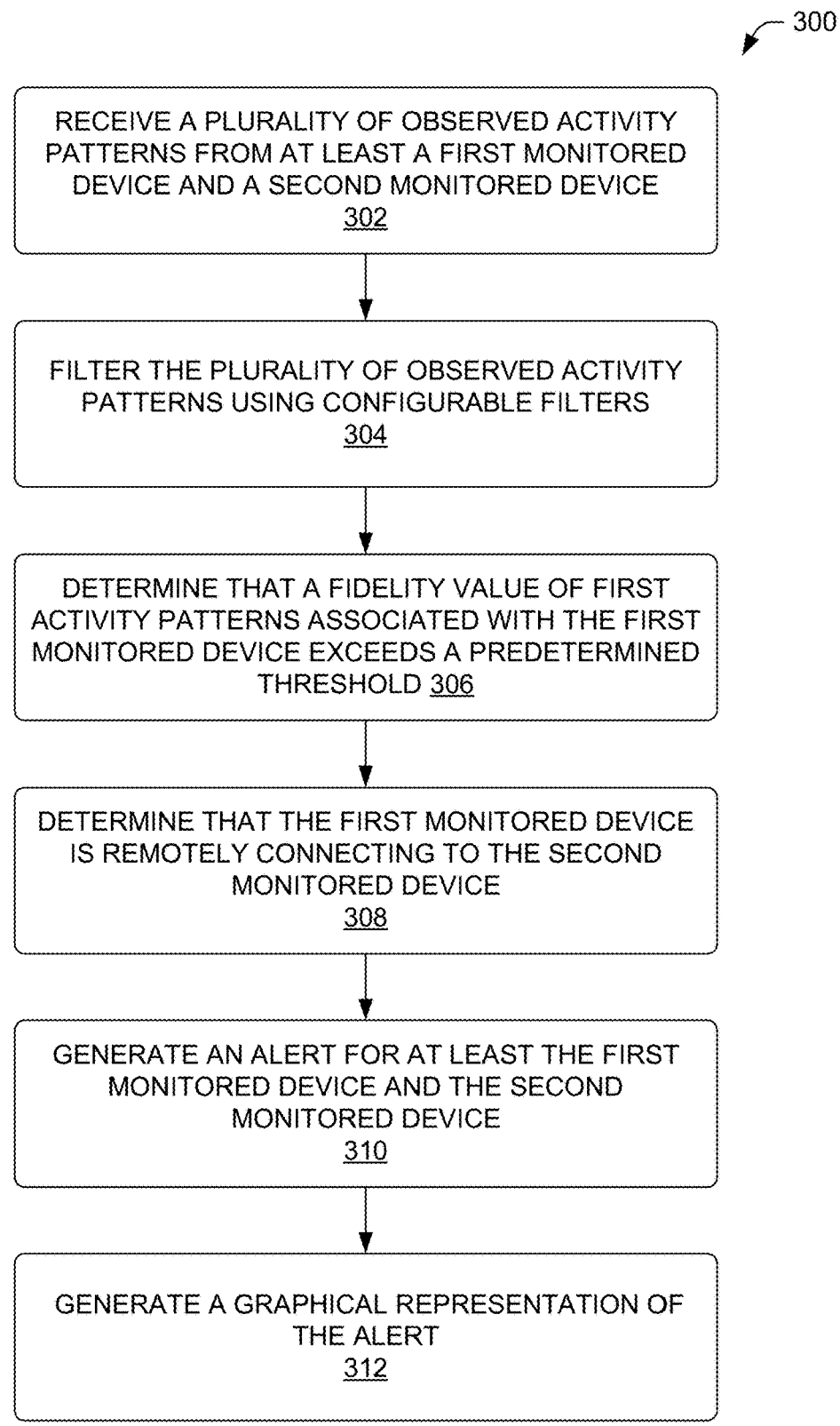
FIG. 3 is a flow diagram of an illustrative process for determining that the activity patterns on a first host machine could indicate a compromised first host machine, and based on the first host machine being connected to a second host machine, determine that the second host machine should be analyzed along with the first host machine.
Figure 5:
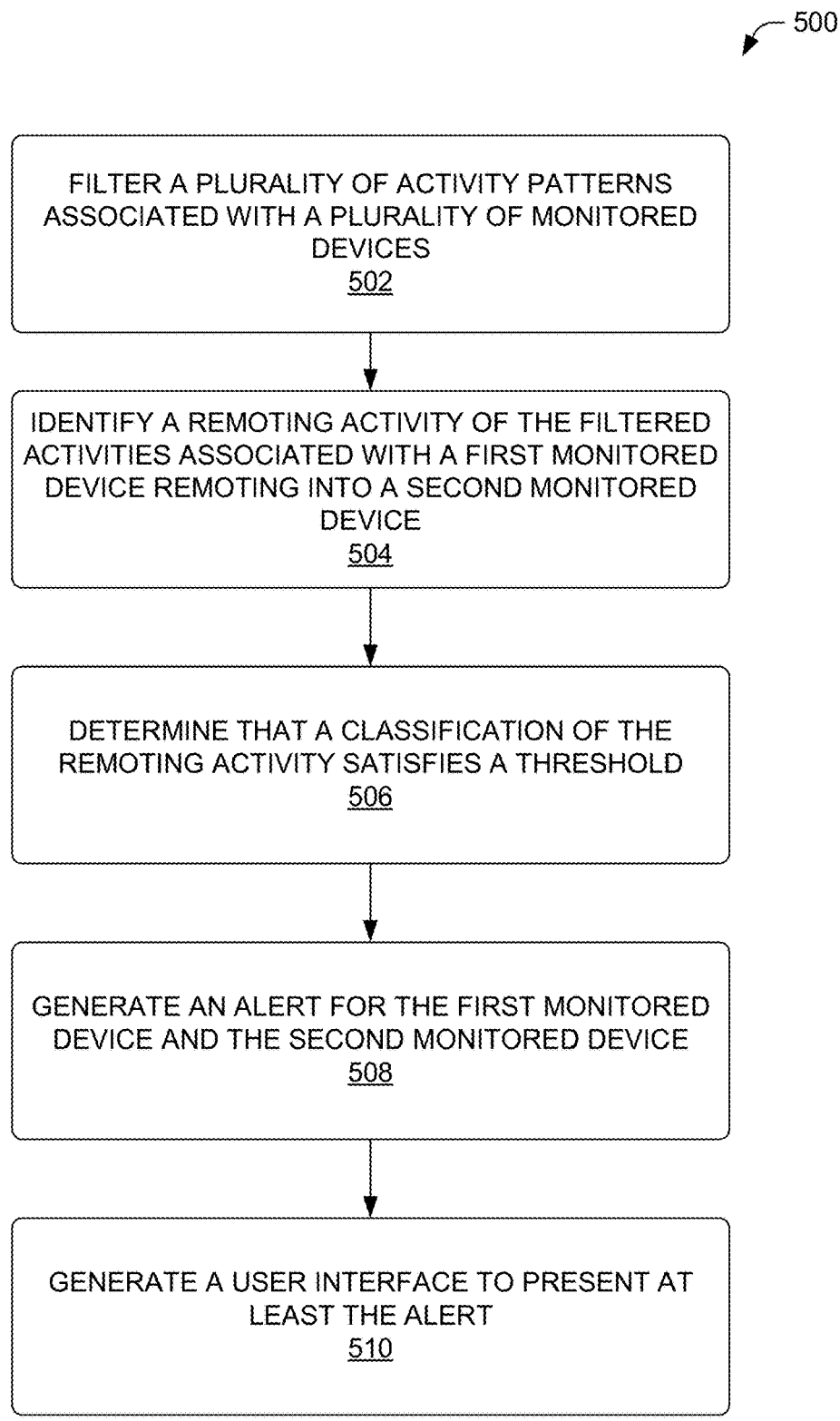
FIG. 5 is a flow diagram of an illustrative process for determining that a first host machine could be attacking a second host machine based on the activity patterns logged on the first and second host machines.

FIGS. 3 and 5 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process 300 for determining that the activity patterns on a first host machine could indicate a compromised first host machine, and based on the first host machine being connected to a second host machine, determine that the second host machine should be analyzed along with the first host machine. The process 300 is described with reference to the system 100 and may be performed by the security service system 104 and/or in cooperation with any one or more of the computing devices 102. Of course, the process 300 (and other processes described herein) may be performed in other similar and/or different environments.

At 302, data collection module 110 may receive observed activity patterns received from a first monitored device and second monitor device of the computing devices 102. The received observed activity patterns may have been filtered by a first configurable filter.

At 304, the activity filtering module 210 may filter the observed activity patterns using configurable filters. The configurable filters may include a manually configured filter with rules set by the analyst 220. The configurable filters may further include a filter configured by a machine learning model. The security service system 104 may update these models based on the received notifications and utilize the models in analyzing the interesting activity patterns. In some embodiments, the activity filtering module 210 may utilize a machine learning model (or algorithm) that is trained on a past corpus of activity patterns and detected malware attacks/intrusions on computing devices 102 that utilized the security service system 104. The activity filtering module 210 may filter the observed activities in order to remove the many legitimate use activity patterns and to isolate "interesting" filtered activity patterns. Additionally, the activity filtering module 210 may classify the severity level for each of the filtered activity patterns depending on the activity pattern type, based on whether that particular activity pattern type is a stronger indication of attack.

At 306, the fidelity module 212 may determine if a fidelity value for a monitored device is above a predetermined severity threshold such that an alert needs to be generated for further analysis. The fidelity value for a host device may be based on the cardinality of the set of filtered activity patterns associated with the monitored device. That is, the fidelity value is the number of activity patterns in the set. Additionally and/or alternatively, the fidelity value for a host device may be based on the severity level of the filtered activity patterns associated with the host device, such that if even one of the activity patterns is classified as high severity level, the fidelity value may be set to a value higher than the predetermined severity threshold. In various embodiments, the severity levels may be assigned a corresponding weight, and the fidelity value may be a tally of the activity patterns modified by the weight. In some embodiments, the fidelity module 212 may trigger a threat alert for the monitored device with the high fidelity value.

At 308, the analysis module 112 may determine if a first monitored device is connected to a second monitored device. As part of determining whether the first monitored device is potentially compromised, the activity patterns may be analyzed. Based on the activity patterns including a cross-machine event, the analysis module 112 may determine that the first monitored device is remotely connected to a second monitored device, and is behaving suspiciously based on the programs executed, commands running, lateral movement, or files opened.

At 310, the alert module 214 may generate a threat alert for the second monitored device based on the first monitored device being connected to the second monitored device. If a threat alert has already been generated for the first device, the second device may be added to that alert, otherwise, a new alert for both devices may be generated. The alert module 214 may prioritize the activity patterns and alerts based on the fidelity value. A high fidelity value associated with a device could indicate a possibly compromised device. The fidelity module 212 may increase a fidelity value of the second host device based at least in part on a possibly compromised device acting remotely on the second host device such that the fidelity value associated with the second host device is also above a predetermined threshold. In various embodiments, the activity patterns between connected hosts may be grouped together to form a group of activity patterns or an activity pattern group. The fidelity module 212 may determine a fidelity value for the activity pattern group. The fidelity value for the activity pattern group may be based on the highest fidelity value on an individual device in the group, based on an aggregate score between the devices, based on a weighted aggregate score between the devices, or any combination thereof.

At 312, the administrative UI 114 may generate a user interface to present the activity patterns or threat alerts. The administrative UI 114 may present the threat alert for the device along with its associated activity patterns. The administrative UI 114 may generate a graphical representation of the threat alerts or group of activity patterns between the machines to draw attention to the cross-machine detection and the interesting activity patterns observed on each machine.

FIG. 4 is a schematic diagram showing an example user interface 400 that may be presented to an analyst based on the threat, activity patterns, and cross-machine activities detected. The administrative UI 114 may cause a user interface 400 to be presented to an analyst 220 utilizing any communication channel including a website or an application that is associated with the security service system 104.

In various embodiments, the administrative UI 114 may present user interface 400 to enable a human security analyst 220 associated with the security service system 104 to view notifications of observed activity patterns, alerts pertaining to computing devices 102 that have been compromised, and make decisions regarding appropriate responses to those activity patterns and alerts. The user interface 400 may generate graphical representations of the alerts and activity patterns. In some embodiments, the graphical representations of the activity patterns may present the activity patterns as groups, where each individual group is the group of activity patterns associated with the host device(s). The user interface 400 may render each activity pattern as a single graphical activity pattern element and each device as larger graphical device element. Connecting lines may be drawn to show the association between the activity pattern element to its associated device element. The connecting lines between the activity pattern element includes connecting lines between the devices to represent the observed cross-machine event. Thus, a group of activity patterns and device(s) elements that are connected may form a single graphical object that represents a group of activity patterns. The graphical activity pattern group object may be rendered as any form of visual representation including but not limited to sprite, skeletal formula, two-dimensional model, and three-dimensional model.

The user interface 400 may present multiple activity pattern groups (for example: activity pattern group 404, activity pattern group 406, and activity pattern group 408) to alert a human analyst of the different group of activity patterns to investigate. The graphical activity pattern group object may present the host device elements as large nodes (example presentation of the nodes is circular but this may be any shape, size, or visual elements) with a connecting element between host device nodes to represent the cross-machine detection event. The activity pattern elements may be presented as smaller nodes. In some embodiments, the graphical elements may change size or be color coded based on element types or severity level. This graphical representation of the activity pattern group with larger nodes representing host devices in this manner is merely one example way of presenting computing devices 102 in the user interface 400, and the user interface 400 is not limited to this manner of presenting currently-monitored machines 102. In some embodiments, the user interface 400 may present groups of host machines together based on any grouping criteria, including groupings by "entity," "department," "office," "team," or any grouping scheme determined by the client.

In some embodiments, the user interface 400 may present the activity pattern group objects in the graphical user interface window based on the activity pattern group object's fidelity value. That is, to better surface a high threat alert, the high threat alert may be more prominently positioned in the interface window, such as front and center. For example, if the alert module 214 has determined that activity pattern group 404 has a higher fidelity value than activity pattern group 406 or activity pattern group 408, then activity pattern group 404 may be more prominently positioned in the front and center. In various embodiments, the user interface 400 may refrain from presenting too many activity pattern group objects in the graphical user interface window based on a threshold object render count. That is, to avoid oversaturation of graphical objects or render limitation on the graphical user interface window, if the number of activity pattern group objects exceeds the threshold object render count, the user interface 400 may select the activity pattern group objects to render based on the alert priority scheme established by the alert module 214. The threshold object render count may be initially set to the same predetermined default count or may be initially set on a scaling system-based count, and may be manually adjusted by an analyst. The scaling system-based count may be a higher count on a higher processing power computing device or larger display, and a lower count on a lesser processing power computing device or smaller display.

The user interface 400 may further present a selection element that, upon selection or mouse over, provides further details pertaining to the alert. In various embodiments, the user interface 400 may receive user input on the rendered graphical elements and based on the user input, the activity patterns report 402 may provide the augmented activities data that the graphical element represents. For example, user cursor input 410 may mouse-over the Host B node on activity pattern group 404 to receive some high-level information for Host B. Then in response to the user cursor input 410 selection of the Host B node, the activity patterns report 402 may present detailed information with augmented data related to the interesting activity patterns associated with Host B device. In some embodiments, the graphical objects may be rendered as three-dimensional models within a graphical three-dimensional (3-D) window space, the user input may control the rotation and zoom of the graphical 3-D window space to help select a specific object.

The user interface 400 may further present a timeline selection element 412 that, upon selection, provides details pertaining to the historical activity patterns during a selected time period 414. The user interface 400 may present indicators 416 within or over the timeline selection element to indicate certain activity pattern types to aid the analyst 220 in identifying certain activity patterns. In additional examples, the user interface 400 may present a timeline that spans a lower portion of the user interface 400 and the timeline may be tagged with indicators 416 that may include different shapes (e.g., triangles, stars, circles, etc.) to visually highlight the different activity pattern types that was detected at a given time.

As a non-limiting example, the activity pattern group 404 may represent Host A device and Host B device as large nodes marked respectively with "Host A" and "Host B." The connecting element, line draw, between Host A node and Host B node may represent the cross-machine detection event. The three smaller nodes marked with "!" with connecting elements to Host A node may represent the interesting event(s) (not including the A-B cross-machine event) observed on Host A device. The two smaller nodes marked with "!" with connecting elements to Host B node may represent the interesting event(s) (not including the A-B cross-machine event) observed on Host B device. Thus, not counting the cross-machine event, three interesting activity patterns have been observed on Host A device and two interesting activity patterns have been observed on Host B device.

As an additional non-limiting example, the activity pattern group 406 and activity pattern group 408 may each represent a group of activity patterns that are separate and distinct from each other and activity pattern group 404. For activity pattern group 406, if we include the count of cross-machine activity for each device, five interesting activity patterns may be associated with the first host device, while two interesting activity patterns may be associated with the second host device. The second host device as represented by activity pattern group 406 demonstrates how a single host device when viewed in a vacuum may not properly demonstrate the severity of the threat. For instance, even with the count of cross-machine activity on the second host device, there are only two interesting activity patterns observed on the device; this may not be enough to surface the second host device for further analysis. However, when grouped with the first host device which is showing more signs of a possible attack, the second host device may receive the proper investigation. The activity pattern group 408 demonstrates how a first host device may have more than one cross-machine activity patterns. Additionally, the user interface 400 may present the timeline selection element 412 for "Host A," with time period 414 selected. The user interface 400 may indicate two cross-machine activities with triangle indicators 416 on the timeline associated with "Host A" to alert the analyst 220 of potential cross-machine attacks.

FIG. 5 is a flow diagram of an illustrative process for determining that a first host machine could be attacking a second host machine based on the activity patterns logged on the first and second host machines. The process 500 is described with reference to the system 100 and may be performed by the security service system 104 in cooperation with any one or more of the computer devices 102. Of course, the process 500 (and other processes described herein) may be performed in other similar and/or different environments.

At 502, the data collection module 110 may receive observed activity patterns received from a first monitored device and second monitored device of the computing devices 102. The received observed activity patterns may have been filtered by a first configurable filter.

At 504, the analysis module 112 may identify if a filtered activity pattern includes a remoting activity associated with a first monitored device remoting into a second monitored device. As part of determining whether the first monitored device is potentially compromised, the filtered activity patterns may be analyzed. Based on the filtered activity patterns including a cross-machine activity, the analysis module 112 may determine that the first monitored device is remotely connected to a second monitored device.

At 506, the analysis module 112 may determine that a classification of the remoting activity satisfies a threshold. That is, the analysis module 112 may look at the classification of the severity level for the remoting activity, and determine if it is above a predetermined severity threshold such that an alert may be generated for further analysis. The fidelity value for a host device may be based on the cardinality of the set of filtered activity patterns associated with the monitored device. That is, the fidelity value is the number of activity patterns in the set. Additionally and/or alternatively, the fidelity value for a host device may be based on the severity level of the filtered activity patterns associated with the host device, such that if even one of the activity patterns is classified as high severity level, the fidelity value may be set to a value higher than the predetermined severity threshold. In various embodiments, the severity levels may be assigned a corresponding weight, and the fidelity value may be a tally of the activity patterns modified by the weight.

At 508, the alert module 214 may generate a threat alert to surface the filtered activity patterns associated with the second monitored device based on the first monitored device being connected to the second monitored device. The alert module 214 may prioritize the activity patterns and alerts based on the fidelity value. If the fidelity value on the first device was determined to be high, it could indicate a possibly compromised first device. The fidelity module 212 may increase a fidelity value of the second host device based at least in part on a possibly compromised device acting remotely on the second host device such that the fidelity value associated with the second host device is also above a predetermined threshold.

At 510, the administrative UI 114 may generate a user interface to present the threat alert for the connected devices. In some embodiments, the administrative UI 114 may present the activity patterns associated with the first and second host devices. The activity patterns associated with the connected devices may be presented together as a group of activity patterns. In various embodiments, the administrative UI 114 may generate visualization of the activity patterns or alerts, and present the visualization of the activity patterns or alerts in the user interface.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a plurality of activity patterns associated with activities observed on at least a first monitored device and a second monitored device;
determining a first activity pattern includes one or more activity patterns associated with the first monitored device, wherein the one or more activity patterns includes a remoting activity, and the one or more activity patterns is associated with a severity level;
determining that a fidelity value of the first monitored device exceeds a predetermined threshold based at least in part on the first activity pattern associated with the first monitored device, wherein the fidelity value is based at least in part on the severity level and a cardinality of the one or more activity patterns modified by a corresponding weight;
generating a threat alert for the first monitored device and the first activity pattern based at least in part on the fidelity value exceeding the predetermined threshold;
determining that the remoting activity includes the first monitored device remoting into the second monitored device and executing a command therein, wherein the first monitored device and the second monitored device are communicatively connected to a local area network; and
updating the threat alert to include the second monitored device and a second activity pattern associated with the second monitored device based at least in part on the remoting activity.

2. The method of claim 1, further comprising:
grouping the first activity pattern with the second activity pattern, based at least in part on the remoting activity, to form an activity pattern group.

3. The method of claim 2, further comprising:
generating a graphical representation of the activity pattern group, wherein the graphical representation of the activity pattern group includes visual elements associated with monitored devices and visual elements associated with activity patterns; and
presenting the graphical representation of the activity pattern group in a user interface.

4. The method of claim 3, further comprising:
receiving a user selection of a visual element associated with the first monitored device; and
presenting activities data associated with the first activity pattern based at least in part on the user selection.

5. The method of claim 1, further comprising:
filtering the plurality of activity patterns using at least one configurable filters to form filtered activity patterns; and
tagging activities data associated with the filtered activity patterns based at least on activity pattern types.

6. The method of claim 5, further comprising:
augmenting the activities data with enrichment data to form augmented data, wherein the enrichment data includes at least one of an activity pattern type, client entity information, adversary entity information, a user profile, or host information; and presenting the threat alert with at least a portion of the augmented data in a user interface.

7. A system comprising:

one or more processors; and one or more computer-readable devices storing computer-executable instructions that, when executed by the one or more processors, perform operations including:

filtering a plurality of activity patterns associated with activities observed on a plurality of monitored devices using a configurable filter, the plurality of monitored devices including at least a first monitored device and a second monitored device, wherein the plurality of monitored devices are communicatively connected to a local area network;

determining a first filtered activity pattern includes one or more filtered activity patterns associated with the first monitored device, wherein the one or more filtered activity patterns includes a remoting activity, and the one or more filtered activity patterns is associated with a severity level;

determining that a fidelity value of the first monitored device exceeds a predetermined threshold based at least in part on the first filtered activity pattern associated with the first monitored device, wherein the fidelity value is based at least in part on the severity level and a cardinality of the one or more filtered activity patterns modified by a corresponding weight observed within a predefined time period;

determining that the remoting activity is associated with the first monitored device remoting into the second monitored device;

generating a threat alert for the second monitored device based at least in part on the fidelity value and the remoting activity; and presenting at least the threat alert on a user interface.

8. The system of claim 7, wherein the operations further include grouping the first filtered activity pattern and a second filtered activity pattern associated with the second monitored device to form an activity pattern group based at least in part on the remoting activity.

9. The system of claim 8, wherein the operations further include:

generating a graphical representation of the activity pattern group; and presenting the graphical representation of the activity pattern group in the user interface.

10. The system of claim 9, wherein the graphical representation of the activity pattern group includes graphical representations of monitored devices and graphical representations of activity patterns.

11. The system of claim 9, wherein the operations further include:

determining a second fidelity value associated with the activity pattern group.

12. The system of claim 11, wherein the operations further include:

generating a new graphical representation of a new activity pattern group; and presenting the new graphical representation of a new activity pattern group on the user interface, wherein the activity pattern group and the new activity pattern group are positioned on the user interface based at least in part on their respective fidelity values.

13. The system of claim 7, wherein the plurality of monitored devices are communicatively connected to the local area network associated with a particular-entity.

14. The system of claim 7, wherein the operations further include:

sending, over a computer network, a notification of the remoting activity to an entity associated with the second monitored device.

15. The system of claim 7, wherein the operations further include:

parsing the plurality of activity patterns to tag at least one of the activities with an activity pattern tag, and augmenting data associated with filtered activity patterns with enrichment data to formed augmented data.

16. A method comprising:

filtering a plurality of activity patterns associated with activities observed on a plurality of monitored devices to form a plurality of filtered activity patterns, wherein the plurality of monitored devices includes at least a first monitored device and a second monitored device;

determining a first filtered activity pattern includes one or more filtered activity patterns associated with the first monitored device, wherein the one or more filtered activity patterns includes a remoting activity and the one or more filtered activity patterns is associated with a severity level;

determining that a fidelity value of the first monitored device exceeds a predetermined threshold based at least in part on the first filtered activity pattern associated with the first monitored device, wherein the fidelity value is based at least in part on the severity level and a cardinality of the one or more filtered activity patterns modified by a corresponding weight;

identifying the remoting activity associated with the first monitored device remoting into the second monitored device, wherein the first monitored device and the second monitored device are communicatively connected to a network associated with an entity;

determining that a classification of the remoting activity satisfies a threshold; and generating a threat alert for the first monitored device and the second monitored device based at least in part on the classification of the remoting activity.

17. The method of claim 16, wherein filtering the plurality of activity patterns further includes tagging the plurality of activity patterns with activity pattern tags based at least on activity pattern types.

18. The method of claim 17, further comprising:

augmenting data associated with the plurality of filtered activity patterns with enrichment data to form augmented data; and in response to a user input for generating a threat report based at least in part on the threat alert, automatically populating a portion of the threat report using the augmented data and the activity pattern tags.

19. The method of claim 16, further comprising:

generating a graphical representation of the threat alert, wherein the graphical representation of the threat alert includes visual elements associated with monitored devices and visual elements associated with activity patterns; and presenting the graphical representation of the threat alert in a user interface.

20. The method of claim 16, further comprising:

grouping the first filtered activity patterns and second filtered activity patterns associated with the second monitored device to form an activity pattern group based at least in part on the remoting activity.

* * * * *